(12) United States Patent
Aseev et al.

(10) Patent No.: US 12,153,494 B2
(45) Date of Patent: *Nov. 26, 2024

(54) SYSTEM AND METHOD FOR SELECTING A BACKUP PLAN BASED ON SAMPLED METADATA

(71) Applicant: Acronis International GmbH, Schaffhausen (CH)

(72) Inventors: Eugene Aseev, Moscow (RU); Stanislav S. Protasov, Singapore (SG); Serguei M. Beloussov, Costa del Sol (SG); Sanjeev Solanki, Pasir Ris (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,615

(22) Filed: Dec. 14, 2021

(65) Prior Publication Data

US 2022/0100611 A1 Mar. 31, 2022

Related U.S. Application Data

(63) Continuation of application No. 15/964,334, filed on Apr. 27, 2018, now Pat. No. 11,237,913, which is a
(Continued)

(51) Int. Cl.
*G06F 11/14* (2006.01)
*G06F 16/182* (2019.01)
(Continued)

(52) U.S. Cl.
CPC ...... *G06F 11/1451* (2013.01); *G06F 11/1464* (2013.01); *G06F 16/182* (2019.01);
(Continued)

(58) Field of Classification Search
CPC .. G06F 11/1451; G06F 16/907; G06F 16/182; G06F 16/285; G06F 11/1464; G06F 2201/84; G06F 16/908; G06F 16/909
See application file for complete search history.

(56) References Cited

U.S. PATENT DOCUMENTS

| 8,924,352 B1 * | 12/2014 | Andruss | G06F 11/1451 |
| | | | 707/654 |
| 2004/0064351 A1 * | 4/2004 | Mikurak | G06Q 30/0269 |
| | | | 705/22 |

(Continued)

*Primary Examiner* — Hosain T Alam
*Assistant Examiner* — Lin Lin M Htay
(74) *Attorney, Agent, or Firm* — ArentFox Schiff LLP; Michael Fainberg

(57) ABSTRACT

A system and method is provided for selecting a backup plan based on sampled metadata. An exemplary method includes sampling metadata of files on a computer during a predetermined time interval, wherein the files are backed up to a storage server in accordance with a first backup plan. The method includes predicting file usage dynamics for a time interval subsequent to the predetermined time interval, based on a combination of the derivative features and the attributes of the metadata, and comparing the predicted file usage dynamics for the time interval with file usage dynamics of the predetermined time interval. In response to determining that a difference between the predicted file usage dynamics and the file usage dynamics of the predetermined time interval exceeds a threshold difference, the method includes selecting a second backup plan for the files, and backing up the files to the storage server accordingly.

15 Claims, 10 Drawing Sheets

Related U.S. Application Data continuation-in-part of application No. 15/922,365, filed on Mar. 15, 2018, now abandoned.

(60) Provisional application No. 62/471,429, filed on Mar. 15, 2017.

(51) Int. Cl.
| | | |
|---|---|---|
| *G06F 16/28* | (2019.01) | |
| *G06F 16/84* | (2019.01) | |
| *G06F 16/907* | (2019.01) | |
| *G06F 16/908* | (2019.01) | |
| *G06F 16/909* | (2019.01) | |

(52) U.S. Cl.
CPC .......... *G06F 16/285* (2019.01); *G06F 16/907* (2019.01); *G06F 16/908* (2019.01); *G06F 16/909* (2019.01); *G06F 2201/84* (2013.01)

(56) References Cited

U.S. PATENT DOCUMENTS

| | | | | |
|---|---|---|---|---|
| 2010/0293147 | A1* | 11/2010 | Snow | G06F 16/10 |
| | | | | 707/E17.007 |
| 2011/0246298 | A1* | 10/2011 | Williams | G06Q 30/0255 |
| | | | | 705/14.71 |
| 2016/0078080 | A1* | 3/2016 | Chen | G06F 11/1464 |
| | | | | 707/654 |
| 2016/0179631 | A1* | 6/2016 | Sun | G06F 11/1471 |
| | | | | 707/648 |

* cited by examiner

SYSTEM AND METHOD FOR SELECTING A BACKUP PLAN BASED ON SAMPLED METADATA

CROSS-REFERENCE TO RELATED APPLICATIONS

The application is a continuation of U.S. application Ser. No. 15/964,334 filed on Apr. 27, 2018, which is continuation in part of U.S. application Ser. No. 15/922,365 filed on Mar. 15, 2018, which claims priority to U.S. Provisional Patent Application No. 62/471,429 entitled "System and Method for Data Classification During File Backup" which was filed on Mar. 15, 2017. The contents of each is incorporated herein by reference in its entirety.

TECHNICAL FIELD

The present disclosure generally relates to the field of electronic data storage, and more particularly, to a system and method for data classification to control file backup operations.

BACKGROUND

Continuing advances in storage technology provide the ability to backup or store significant amounts of digital data cheaply and efficiently. Nevertheless, when backing up data, computer systems, administrators, and the like, are often faced with the problem of data prioritization because the amount of user data to be backed up continues to grow. This increasing amount of data is a contributing factor to the increasing costs of data backup. These costs can be prohibitively expensive for many individuals and businesses.

It is also well known that portions of the user data are more critical than others—in other words, some data is highly prioritized for back-up while other data is comparatively less prioritized. Thus, there is a need for reliable storage that provides a greater guarantee for the preservation of the more critical data than existing solutions. In typical scenarios, a user (or an administrator) can designate storage priorities for various data. However, for significant volumes of data typical in modern businesses, manual designation is an ineffective way to solve the problem.

Accordingly, a system and method is needed that provides an automated solution to address the problem of data backup for high volumes of data based on a smart data classification methodology.

SUMMARY

Thus, a system and method is disclosed herein for data classification to control file backup operations.

According to an exemplary aspect, a method is provided for performing automatic backup of electronic data. The exemplary method includes sampling metadata of one or more files on a computer at a predetermined time interval, determining whether the metadata has changed over time after a predetermined amount of metadata is collected, deriving a model of the change of the metadata over time when the metadata has changed over time, wherein the model of change is a snapshot of dynamically sampled attributes of the one or more files and reflects a state of the computer, performing an analysis of the model of change by determining features of the one or more files comprising at least file usage dynamics of the computer and a user associated with the one or more files based on the model, and selecting a backup plan for the one or more files according to the file usage dynamics.

In one aspect, the method further comprises the predicting file usage dynamics of the computer and the user based on the model of change.

In another aspect, the method further comprises generating an urgency model based on the metadata, deriving an urgency of each of the one or more files based on the urgency model, the urgency indicating how soon a file must be retrieved from backup; and backing up files to a storage server according to the urgency.

In another aspect, the method further comprises wherein the urgency comprises a plurality of categories from conditions that call for backing up a file in low latency storage to conditions that call for backing up the file in high latency storage.

In another aspect, the method further comprises predicting urgency of new files on the computer based on the urgency model and predicting attributes of new files on the computer based on the urgency model.

In another aspect, the method further comprises wherein attributes comprise one or more of data type and data size.

In another aspect, the method further comprises predicting one or more of a growth of a particular file type, and a growth of a capacity of the computer based on the model of change.

In another aspect, the method further comprises predicting, using the model of change and the urgency model, which kinds of files are subjected to particular file operations more often that other kinds of files, predicting which kinds of files grow in a monotonic manner, predicting which kinds of files are periodically or un-periodically accessed and predicting file operations that cause change in system storage capacity or backup, the change being greater than a predetermined threshold.

In another aspect, the method further comprises deriving derivative features from attributes of the metadata and predicting the file usage dynamics based on a combination of the derivative features and the attributes of the metadata.

In another aspect, the method further comprises analyzing values in the attributes of metadata, encoding the values that were analyzed into encoded values in a particular format, bounding the encoded values according to the format and deriving derivative the features from the attributes in the metadata according to the encoded values.

An exemplary system according to the aspects of the disclosure includes a hardware processor configured to sample metadata of one or more files on a computer at a predetermined time interval, determine whether the metadata has changed over time after a predetermined amount of metadata is collected, derive a model of the change of the metadata over time when the metadata has changed over time, determine file usage dynamics of the computer and a user associated with the one or more files based on the model, and select a backup plan for the one or more files according to the file usage dynamics.

An exemplary computer-readable medium according to the aspects of the disclosure include instructions that comprise sampling metadata of one or more files on a computer at a predetermined time interval, determining whether the metadata has changed over time after a predetermined amount of metadata is collected, deriving a model of the change of the metadata over time when the metadata has changed over time, determining file usage dynamics of the computer and a user associated with the one or more files based on the model and selecting a backup plan for the one or more files according to the file usage dynamics.

The above-simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Exemplary aspects are described herein in the context of a system, method, and computer program product for deploying a distributed computing system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
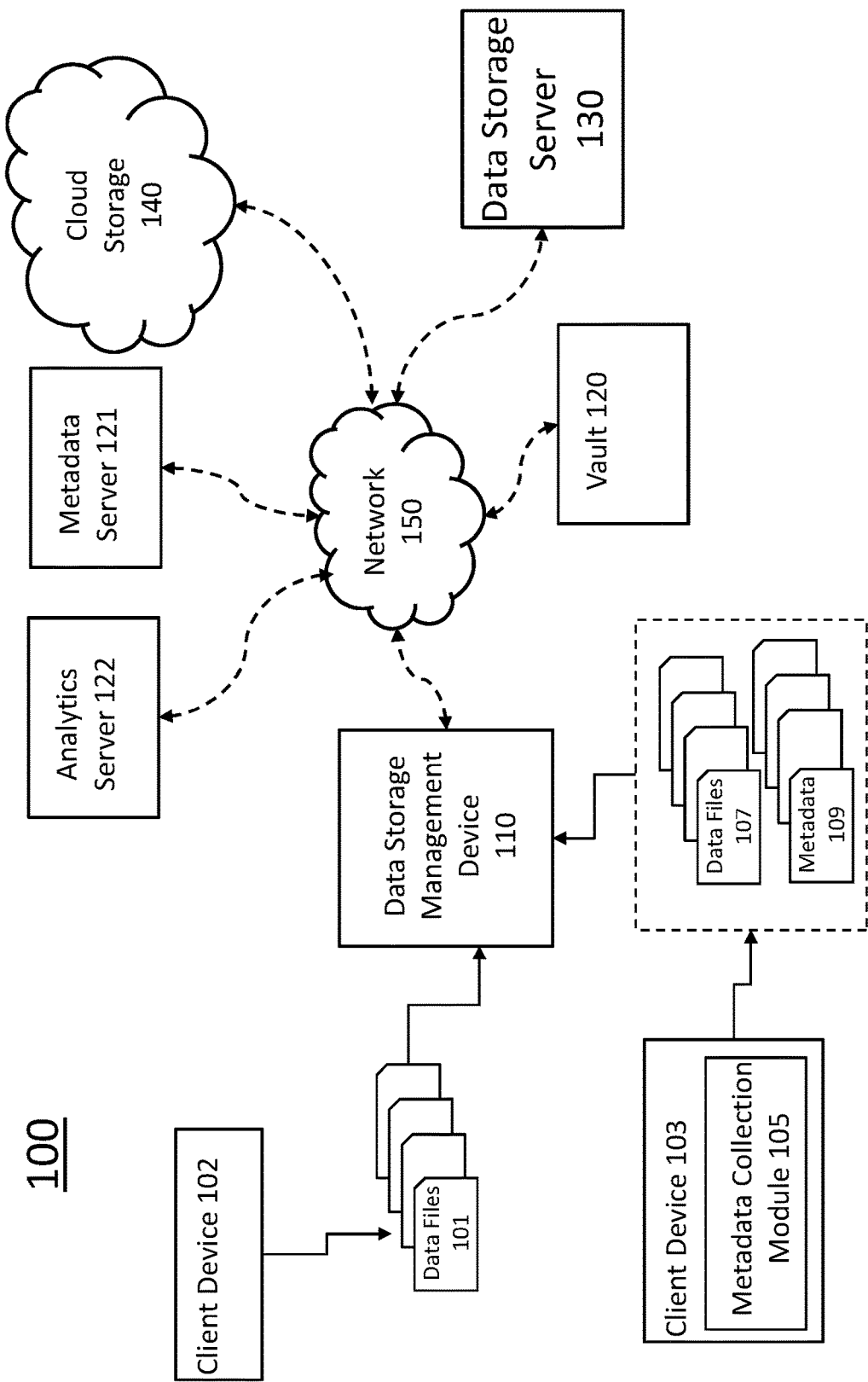
FIG. 1 illustrates a block diagram of a system for data classification to control file backup operations according to an exemplary aspect.

FIG. 1 illustrates a block diagram of a system for data classification to control file backup operations according to an exemplary aspect. As generally shown, the system 100 includes a data storage management device 110 that is configured to receive a plurality of data objects, data files, and other electronic and user data from a client device 102 or a client device 103, and control the storage of each file to one or a plurality of storage devices. In some aspects, a file is an object which resides on a file system, whereas an object can exist inside or outside of a filesystem. On one aspect, the client devices may also comprise a metadata collection module, such as metadata collection module 105 on client 103. The metadata collection module 105 collects metadata 109 related to files 107. The packets exchanged between the data storage management device 110 and the client devices include both the data from data files 107 and the metadata 109 related to the files 107.

According to the exemplary aspect, the storage devices can include, for example, one or more critical vaults 120, a metadata server 121, an analytics server 122, one or more one or more storage servers 130, and cloud storage 140. The critical vault 120 can be a secure data device/network that provides a repository having maximum redundancy and enhanced safety/security requirements for storage as compared to other storage options. In one aspect, the critical vault 120 is data storage that stores the most recent changes of the most important files that are backed up, for example by continuous data protection, or the like. The critical data vault 120 contains primarily data that is critical in nature, not in terms of security. In one aspect, data storage server 130 is also configured to store the metadata 109 received from client devices.

Additionally, the system 100 may further comprise a metadata server 121 and an analytics server 122. According to one aspect, the metadata server 121 may extract the stored metadata on a regular basis (in other words, sample the metadata according to a predetermined schedule) on the various storage devices such as vault 120, data storage server 130 and cloud storage 140. In one aspect, metadata comprises details about file creation, access, modification, filename, file size, file location and the like. Over time, as a file is being used, the file's metadata attributes dynamically change to new values to reflect present status of the file. The snapshot of attributes dynamically sampled at regular intervals forms a model of change that is able to reflect on the state of a computer's file usage dynamics by showing how metadata has changed over a period of time, and how file classifications have changed over time. The analytics server 122 performs analysis on the metadata to determine features of files. The changes to these features occurring over time, and the dependency of the changes based on file type, file size, and the like are analyzed by the analytics server 122. The analytics server 122 also performs predictions regarding the files on the client devices based on the determined changes. These changes and analysis or there derivatives can be used to enable intelligent data storage in backup systems such as system 100.

In some aspects, features that can be extracted from the metadata can include "file extension", "file size", "file opening", "file closing", "file open time", "file close time", "file access", "file change", "file create", "file remove" or the like. Some predictions that the analytics server 122 can make include prediction of file size growth with time for specific user or users. Additionally, the predictions by the analytics server may include determinations of:

What kind of file are more often created/opened/accessed/changed/removed etc.,
What kind of files grows in monotonic manner,
What kind of files are periodically or a-periodically accessed, What kind of operations (created/opened/accessed/changed/removed) cause relatively large change is system storage capacity or backup, and What are outliers?

According to one aspect, outliers are aperiodic events. For example, outliers may include files that were not accessed for a long time, files that get accessed and/or files created with parameters that do not fit in an analyzed range (like a very large file size appear, e.g., greater than a threshold size, large number of files created, accessed or deleted). These kinds of events are irregular and be considered as outliers. According to one aspect, these events are considered outliers at least the first time of occurrence.

File usage dynamics may differ across various homes, enterprises and users as well. Home computer users or corporate/organizational users create, access or modify their files (e.g., data files 101 or 107) in periodic or random manner. All changes to files are reflected in the file metadata (e.g., metadata 109). Active users or clients create or modify pre-existing files and access file as well, but on a regular basis as opposed to periodically. Passive users or clients occasionally create or modify files and usually access files on regular basis rather than create those files. Both active and passive users may have files that are "urgent", whose access is required that were created, accessed or modified over a certain period of time or of certain size or of certain type. In one aspect, "urgency" may refer to or derived from file attributes and may be monitored at regular intervals. In this aspect, file urgency is classified into two or more categories from conditions that call for backing up a file in low latency storage to conditions that call for the file to be backed up in high latency storage. For example, a file that has a high urgency may be backed up in a low latency storage device because the file is in high demand, while a file that has low urgency may be backed up to high latency storage because it is not in demand as often. In some aspects of the system 100, file attributes may be predicted in order to future proof storage backup system such as system 100. Similarly, predicting file attributes on home or corporate computer systems for users enables the ability to intelligently handle user file urgency.

In an exemplary aspect, the cloud storage 140 can be a cloud-based storage service, such as Amazon® Simple Storage Service ("S3"), and Microsoft® Azure ("Azure"). In general, companies such as Microsoft® and Amazon® (i.e., "storage service providers") set up networks and infrastructure to provide one or more multi-client services (such as various types of cloud-based storage) that are accessible via the Internet and/or other networks to a distributed set of clients in a company, organization or the like. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

The one or more storage servers 130 can be local storage servers (managed by the user, business, etc.) that provide common data backup, but not to the degree of security and safety as the critical vault 120, for example. In some aspects the one or more storage servers 130 are on the same local or wide area network as the data storage management device 110, while in other aspects the one or more storage servers 130 are on a different network than the data storage management device 110. In some aspects, the one or more storage servers 130 may be on the same network, or on different networks from one another.

As further shown in FIG. 1, the data storage management device 110 is configured to communicate with each of the storage devices by one or more networks 150. According to an exemplary aspect, the applicable network 150 can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructure such as Ethernet, WiFi and the like.

According to the exemplary aspect, the data storage management device 110 may be configured to receive the data files 101 (in response to a request from a client device hosting the data files 101, for example) and classify the received data files accordingly. Based on the classification, the data storage management device 110 may be configured to automatically determine whether each data file needs to be stored and the type of storage level that should be afforded the data file, i.e., which of the one or more data storage devices/networks should store the data file. Additionally, the data storage management device 110 may be configured to receive the data files 107 and metadata 109 at a regular time interval, and classify the data accordingly. The changing classification can be used to predict, by the analytics server 122, future classifications of the data files 107 and new similar files from client devices in the future.

Figure 2:
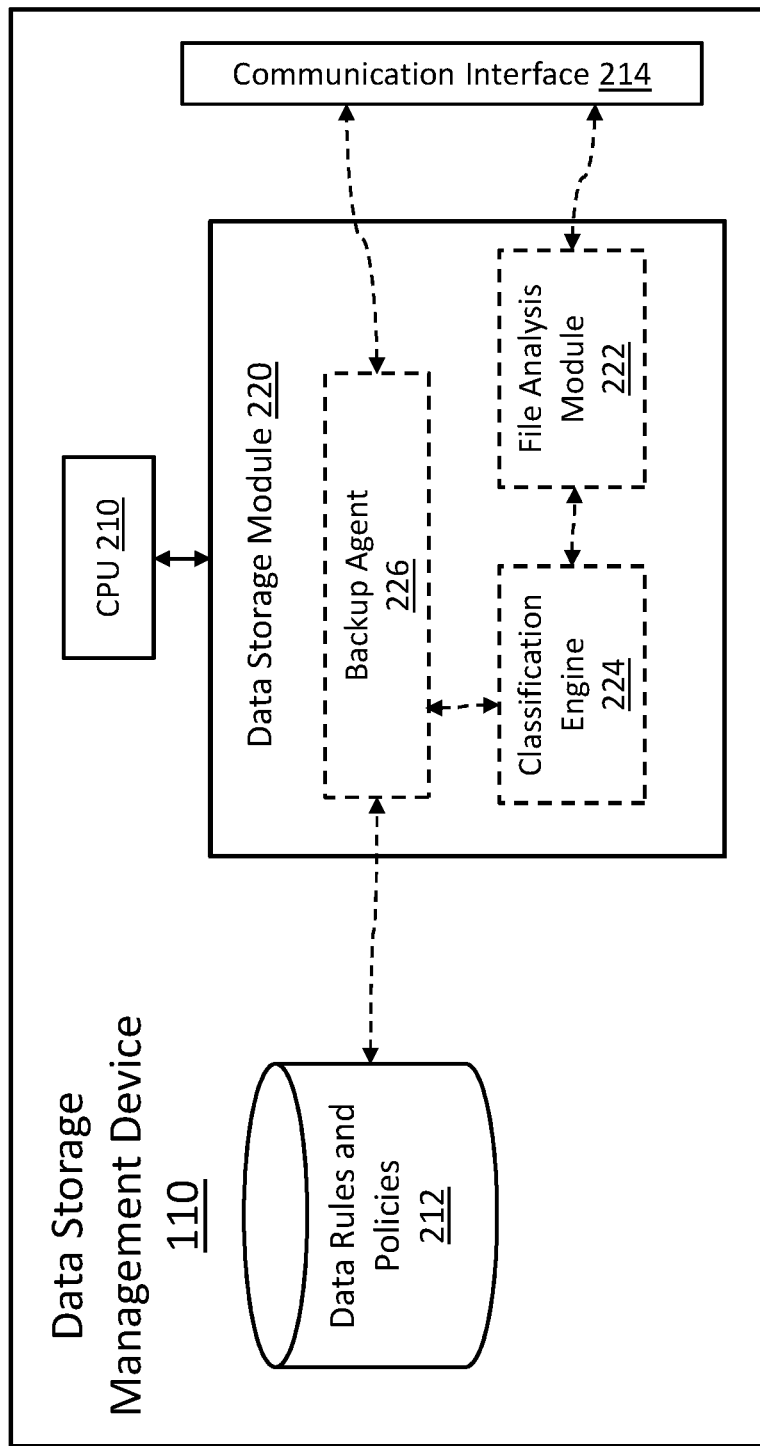
FIG. 2 illustrates a block diagram of the data storage management device for data classification to control file backup operations according to an exemplary aspect.

FIG. 2 is a block diagram of the data storage management device for data classification to control file backup operations according to an exemplary aspect. In the exemplary aspect, the data storage management device 110 includes a central processing unit ("CPU") 210 configured to execute one or more modules, including data storage module 220. The data storage management device 110 may be implemented on computer system shown in FIG. 4. Accordingly, although not shown in detail in FIG. 2, the data storage management device 110 also includes electronic memory that stores executable code that is executed by the CPU 210 to execute one or a plurality of modules configured to perform the algorithms disclosed herein, including the data storage module 220.

In general, the term "module" as used herein can refer to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

As further shown, the data storage management device 110 can include a communication interface 214 (e.g., a plurality of I/O interfaces) that provides for communication with client devices requesting storage of files 101 as well as the plurality of storage devices. A more detailed example of the hardware and software components of the data storage management device 110 is discussed below with respect to FIG. 9.

Furthermore, the data storage management device 110 includes the data storage module 220 and a database of data rules and policies 212 that is accessed by the data storage module 220 to facilitate the classification of data files 101 based on identified parameters for the received data files 101. In one aspect, policies are predefined, while data rules may be dynamically created.

According to the exemplary aspect, a file analysis module 222 is a component of the data storage module 220 and is configured to analyze/parse the received files 101 to extract and collect file properties and parameters (where properties and parameters are used interchangeably throughout the disclosure). According to one aspect, the file properties and parameters may include the metadata of the received files 101.

This file analysis module is coupled to the classification engine 224, which receives the collected metadata. The classification engine 224 is configured to classify each file according to certain parameters and properties of the file 101. In some aspects, the parameters and properties used by the classification engine 224 may include: file extension (i.e., file type), such as .doc, .pdf, .jpeg and the like; data type, which is a broader parameter compared to file type parameter and includes both the file types and other criteria that allow classification of the data to one or another categories; file name (e.g., if the file name contains any words or phrases that identify its level of importance, such as "Important", "Confidential", "Passwords", "Contract", and the like); file metadata (e.g., keywords); file content; data access rights (e.g., security policy applied to the file); and data access frequency (how often/rare was a file opened/read, etc.). It should be appreciated that while these particular properties are identified for purposes of the exemplary aspect, additional file properties and/or parameters can be used for classification of the file according to alternative aspects.

Upon identifying one or a plurality of the properties and parameters of the data files 101, the classification engine 224 provides the classification to the backup agent 226, which can also be a component of the data storage module 220, according to an exemplary aspect. In this regard, the backup agent 226 is configured to access the data rules and policies 212, which can be stored in the memory of data storage management device 110, and apply the properties/parameters to the set of rules to automatically determine the required backup level for the particular data objects/files 101 depending on the classification. In one example, the data rules and policies 212 may be a number of business rules formed of "If/Then" statements. Thus, applying each of the parameters and properties as the "If" statement, the resulting action (i.e., the "Then" statement) will define the appropriate storage level (i.e., storage procedure or instruction) for storage/archive of each of the files 101, as discussed in more detail below.

For example, in one aspect, the classification engine 224 can determine whether the file 101 is used for sharing, i.e., it is shared file between multiple devices and/or users. The usage determination can be based on one or more of the file metadata, data access frequency and/or data access rights, for example. In a refinement of this aspect, the classification engine 224 can also use the identified parameters to determine whether a file of the files 101 is stored in "synchronized directories", as for example, it is stored using known synchronization cloud services such as Dropbox®, Microsoft® OneDrive® or Google Drive®. Based on the classifications by the classification engine 224, there may be a data rule and policy that indicates that the file of files 101 may be excluded from the files for backup because the probability of loss is significantly lower. Accordingly, the backup agent 226 is configured to apply the identified properties to the data rules and policies 212 and confirm that no backup is needed for this particular file. In this instance, the data storage module 220 will take no further action and will not send the file to one of the storage systems discussed above.

In yet another example, the classification engine 224 can identify each of the files 101 (alternatively referred to as a singular file 101) as important or critical based on the file name, file owner, or the like. In this instance, the data rules and policies 212 may include a rule that if the data file 101 is recognized as important or critical, then during the backup process, a repository can be selected that enables increased guarantee of safety. For example, the file 101 may be stored with higher redundancy (e.g., in one or more storage servers 130, compared with conventional data (i.e., not critical data) that may be stored in a single storage server. In one aspect, critical data is that data which is of at least a certain level of importance to a user. Changes to critical files can make a difference to the user. In a refinement of this aspect, the data file 101 that is critical or important may be simultaneously stored in the cloud storage 140 and also in one or more local one or more storage servers 130. In yet another refinement, such critical data 101 may be stored in critical vault 120, which can be a data repository having maximum redundancy and enhanced safety requirements for storage, according to the exemplary aspect.

Furthermore, the data rules and policies 212 can include rules indicating that conventional (e.g., ordinary, or non-critical) data, which does not represent the increased importance or criticality value, can be stored in accordance with the standard terms and conditions (policies) backup, such as being stored in only one storage device of the storage server 130. Finally, in accordance with the established rules of the classification, some of the data can be recognized as unimportant and not requiring any type of backup.

Accordingly, it should be appreciated that according to the exemplary system 100, the data storage management device 110 provides an automated data storage process that automatically classifies each data file 101 based on identified properties and parameters and stores the files according to different storage protocols providing varying levels of security and safety. Moreover, the storage rules can be predefined in accordance with data rules and policies 212, which may be configurable and predefined by a system administrator, operator, or the like. For example, the data storage module 220 may include a software module configured to generate a graphical user interface ("GUI") that can be presented on a screen of the data storage management device 110. The GUI may provide a series of business rules in one aspect, If/Then statements) that can be configurable by a user of the device 110 (i.e., a system administrator) to set the storage rules accordingly. For example, if the system 100 is being performed for a business corporation, the rules may include the option to identify all files created/modified by one or more particular users (e.g., each officer of the business) as "critical". Moreover, the files created/modified by other uses will be treated as "ordinary" or "normal" files, unless other parameters and properties apply. Based on the classifications of the classification engine 224, the files can be stored according to the data backup rules (e.g., "critical" files are stored in critical vault 120) as described above.

Figure 3:
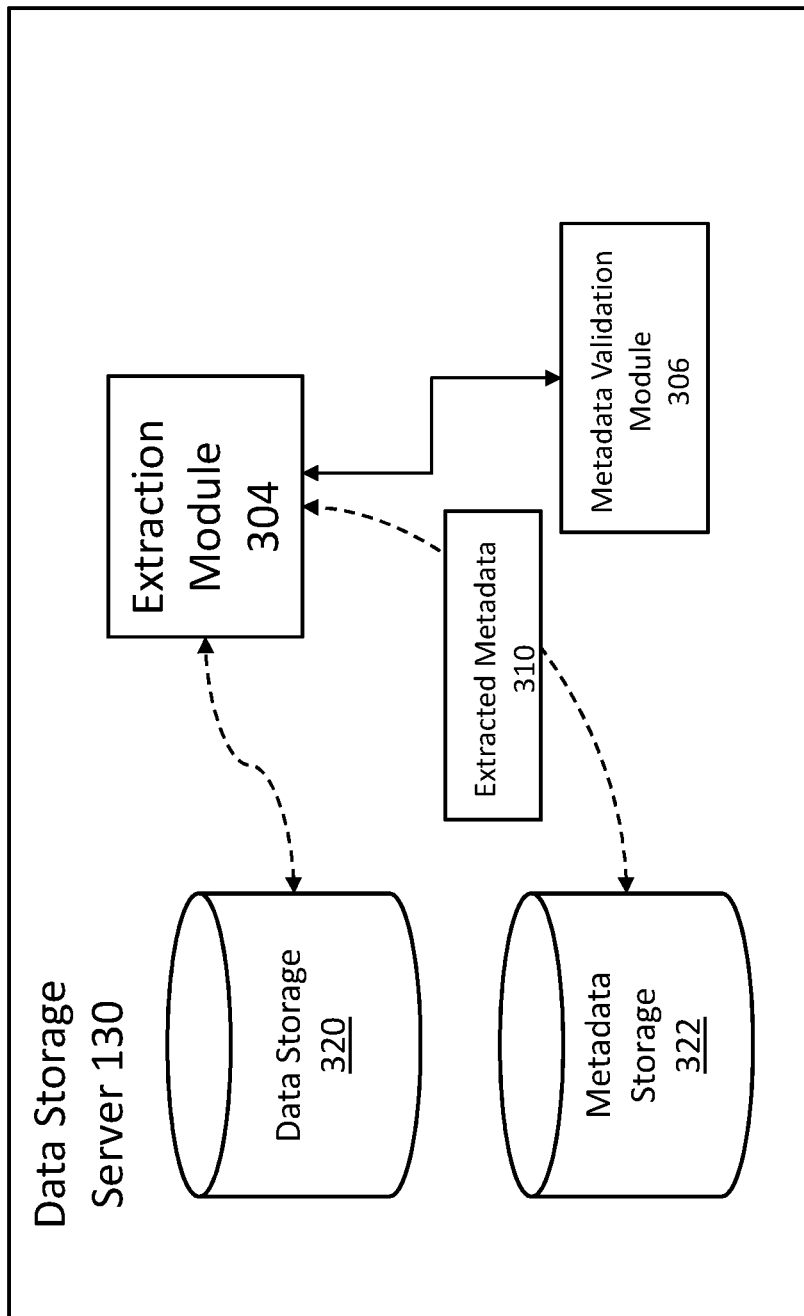
FIG. 3 is a block diagram of the data storage server for data storage according to an exemplary aspect.

FIG. 3 is a block diagram of the data storage server 130 according to an exemplary aspect. The data storage server 130 comprises an extraction module 304, a metadata validation module 306, data storage 320 and metadata storage 322. In the exemplary aspect, the data storage server 130 includes a central processing unit ("CPU") configured to execute one or more modules, including the extraction module 304 and the metadata validation module 306. The data storage server 130 may be implemented on computer system shown in FIG. 9. Accordingly, although not shown in detail in FIG. 3, the data storage server 130 also includes electronic memory that stores executable code that is executed by the CPU to execute one or a plurality of modules configured to perform the algorithms disclosed herein.

The data storage server 130 receives the data files 101, data files 107 and corresponding metadata 109 from various client devices such as client device 102 and client device 103. The extraction module 304 extracts data from the received packets and stores the data in data storage 320. The extraction module 304 also extracts the metadata as extracted metadata 310. However, prior to storing the metadata, the data storage server 130 invokes the metadata validation module 306 to validate the extracted metadata 310.

The metadata validation module 306 performs validation by determining whether the extracted metadata 310 was successfully extracted and that the extracted metadata 310 is ready for metadata storage. Specifically, in one aspect, the extracted metadata 310 is inspected for completeness and once validated, the metadata is ready for storage. According to one aspect, validation comprises standard checking for number of records, record length, record type and/or additional requirements for distributed storage in terms of indexing, naming index or other constraints (if needed) based on actual implementation architecture. After validation, the data storage server 130 stores the extracted metadata 310 in metadata storage 322.

The data storage server 102 determines a model of change of the metadata over time after a predetermined time of metadata collection.

Figure 4:
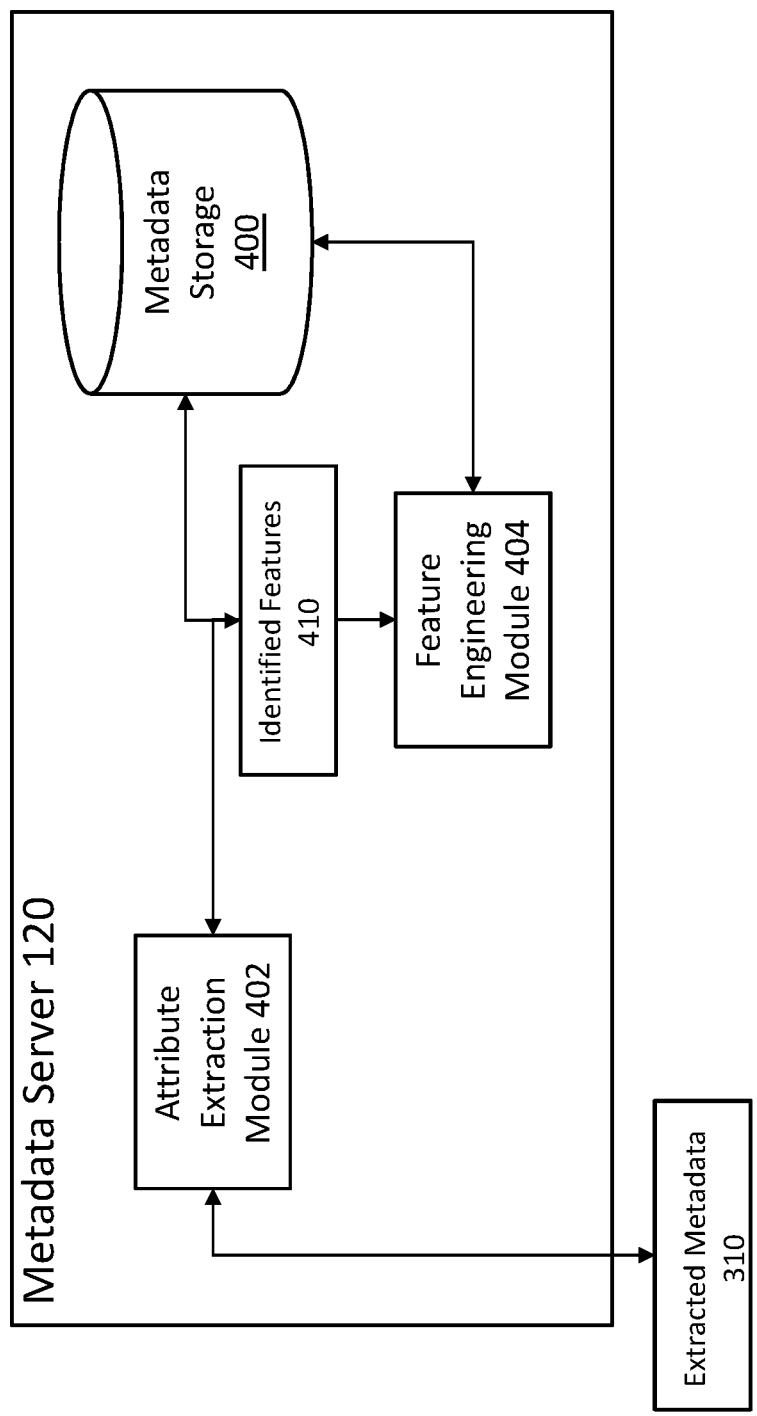
FIG. 4 is a block diagram of the metadata server for metadata extraction and storage according to an exemplary aspect.

FIG. 4 is a block diagram of the metadata server 121 according to an exemplary aspect. The metadata server 121 comprises an attribute extraction module 402, a feature engineering module 404, and metadata storage 400. In the exemplary aspect, the metadata server 121 includes a central processing unit ("CPU") configured to execute one or more modules, including the attribute extraction module 402 and the feature engineering module 404. The metadata server 121 may be implemented on computer system shown in FIG. 9. Accordingly, although not shown in detail in FIG. 4, the metadata server 121 also includes electronic memory that stores executable code that is executed by the CPU to execute one or a plurality of modules configured to perform the algorithms disclosed herein.

In one aspect, the data storage server 130 transmits the extracted metadata to the metadata server 121. In another aspect, the metadata server 121 extracts metadata from the metadata storage 322. Regardless of how the metadata is received however, the attribute extraction module 402 extracts attributes from the extracted metadata 310. Specifically, the attribute extraction module 402 extracts identifies features 410 in the metadata. The identified features 410 are stored in the metadata storage 400. In some aspects, these features may include at least file extension", "file size", "file opening", "file closing", "file open time", "file close time", "file access", "file change", "file create", "file remove". Any attributes of files that are saved on a client device are also saved in the metadata and thus can be used as attributes, not limited to those attributes/features described above.

The feature engineering module 404 is a preprocessor for analytics performed on the metadata. The feature engineering module 404 may encode values embedded in the metadata into a predetermined format (for example, a numeric format). Then, these encoded values in the metadata may be analyzed by the feature engineering module 404 to identify types of data such as numerical, textual, date, values and the like, and the values are bound into particular ranges (e.g., normalized) appropriate to the value type. Further, the feature engineering module 404 also may normalize any of the values in the metadata after encoding and prior to bounding, or after bounding. Normalization may be performed feature by feature, or several features may be combined without causing changes in the relationship between features in a pair, or jointly.

Additionally, in one aspect the feature engineering module 404 creates or generates new or derivative features based on the identified features 410 and stores these derived features in the metadata storage 400. Derivative features are those features that are not directly captured from the metadata received from client machines, but rather those attributes created based on existing features/attributes extracted by the attribute extraction module to aid in the prediction process or answering questions such as:
 a. What kind of files are more often created/opened/ accessed/changed/removed etc.?
 b. What kind of files grows in a monotonic manner?
 c. What kind of files are periodically or a-periodically accessed?
 d. What kind of operation's (created/opened/accessed/ changed/removed) cause relatively large change in system storage capacity or backup?
 e. What are the outliers in terms of data, in terms of file types, and the like?

According to one aspect, an outlier is an attribute or value which is not predicable based on preexisting analysis.

In one aspect, the derived features may include selecting the date/time attribute extracted by the attribute extraction module 402, and transforming the date/time into seconds, days, or the like, or splitting the date/time into days, months and years to create new features. Additionally, in some aspects derivative features can further be obtained by combing two or more features like size with time feature, or filetype with size or filetype with time or file usage frequency with types/sizes/times, though the combinations are not limited thereto.

Figure 5:
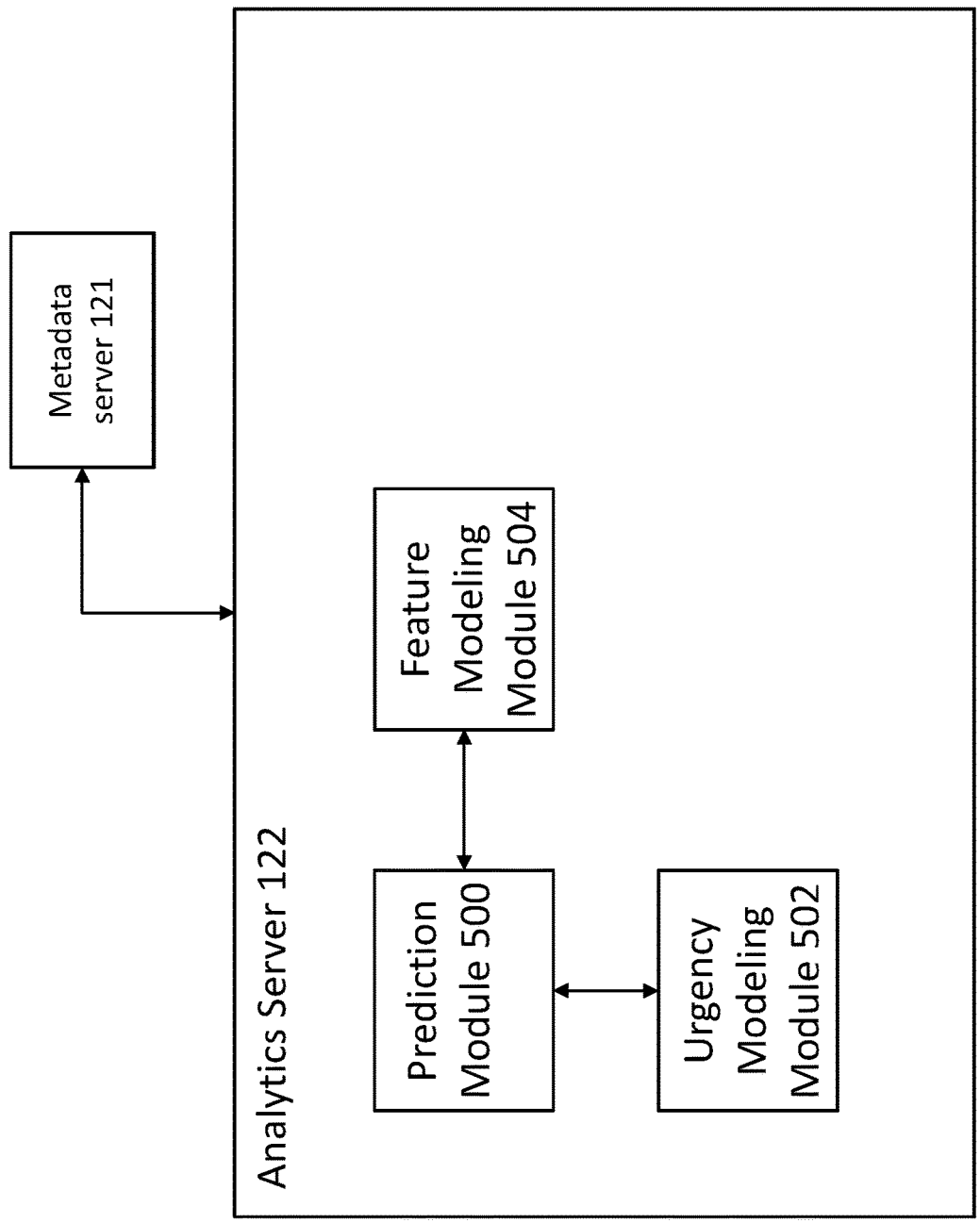
FIG. 5 is a block diagram of the analytics server for metadata analysis according to an exemplary aspect.

FIG. 5 is a block diagram of the analytics server 122 according to an exemplary aspect. The analytics server 122 comprises a prediction module 500, a feature modeling module 504, and an urgency modeling module 502. The feature modeling module 504 uses feature engineering module 404 to perform modelling tasks such as training, testing and prediction for decision making.

In the exemplary aspect, the metadata server 121 includes a central processing unit ("CPU") configured to execute one or more modules, including the prediction module 500, the feature modeling module 504, and the urgency modeling module 502. The analytics server 122 may be implemented on computer system shown in FIG. 9. Accordingly, although not shown in detail in FIG. 5, the analytics server 122 also includes electronic memory that stores executable code that is executed by the CPU to execute one or a plurality of modules configured to perform the algorithms disclosed herein.

The analytics server 122 is configured to perform analytics on the features stored on the metadata storage 400, which includes both identified features 410 and derived features generated by the feature engineering module 404 based on the identified features 410. In one aspect, the metadata server 121 transmits the feature information to the analytics server 122, while in another aspect, the analytics server 122 polls the metadata server 121 to access the feature information from the metadata storage 400. The analytics server 122 is further configured to determine file usage dynamics based on the changing attribute/feature information from metadata storage 400. The file usage dynamics indicate how particular files types grow, are used, where they are stored, and the like. Such information is used by the analytics server 122 to select a data backup plan for new files received from client devices.

In one aspect, the prediction module 500 may perform predictions about the types, sizes and urgency of files that a client device may store. The urgency modeling module 502 models file urgency based on the feature information from the metadata storage 400. The feature modeling module 504 may create a model related to the types and sizes of files on a client computer, the model indicating how a particular pattern of attributes/features indicates the types and sizes.

In one aspect, the prediction module 500 uses artificial intelligence and machine learning to perform predictions based on the urgency model created by the urgency modeling module 502 and a feature model provided by the feature modeling module 504.

The urgency model may indicate that when particular features or derived features have particular values or a range of values, then that file has been urgent in the past, and thus files with such features/values will also be urgent. Accordingly, a backup plan based on the predicted urgency can be suggested or predicted by the prediction module 500. As the amount of data increases over time, the prediction module 500 uses machine learning to enhance the urgency model and provide more robust predictions that are more accurate and useful.

In one aspect, the feature model and the urgency model can together aid the prediction module 500 in predicting whether a new or unknown file will be stored on a user's computed based on historical feature information. The prediction module 500 can also use the feature and urgency models to predict client computer or PC capacity growth and file type growth.

The prediction module 500 may also answer questions regarding the data such as:
What kind of files are more often created/opened/accessed/changed/removed etc.?
b. What kind of files grows in a monotonic manner?
c. What kind of files are periodically or a-periodically accessed?
d. What kind of operation's (created/opened/accessed/changed/removed) cause relatively large change in system storage capacity or backup?
e. What are the outliers in terms of data, in terms of file types, and the like?

The system 100 with data based prediction capabilities will enable the adjustment and tuning of file level data backup policies. The system 100 will further allow learning about changes in user (or user's) file usage pattern and to make changes to backup system in automated fashion. In case of a disaster, an individual user level may recover identified urgent data with high priority while other data can be recovered with low priority.

Figure 6A:
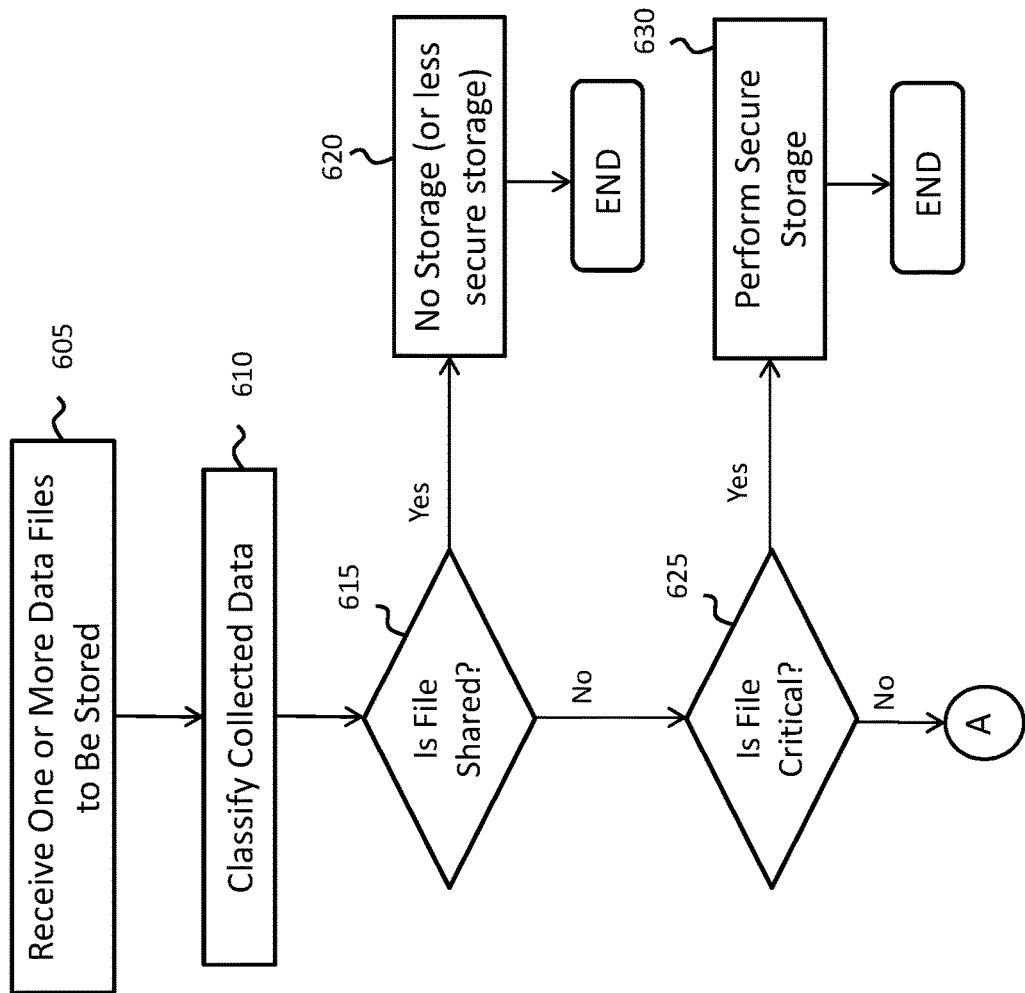
FIGS. 6A and 6B illustrate a flowchart of a method for data classification to control file backup operations according to an exemplary aspect.
Figure 6B:
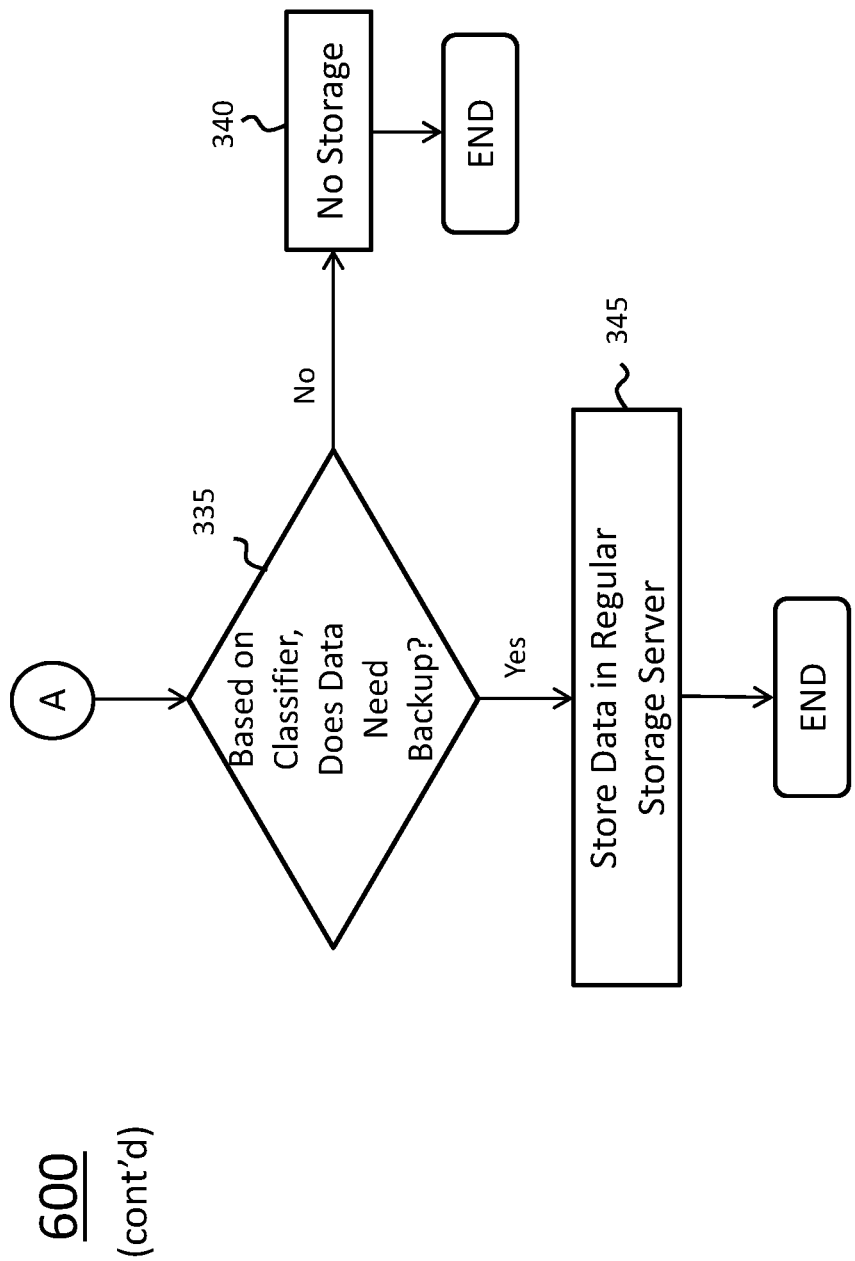

FIGS. 6A and 6B illustrate a flowchart of a method 600 for data classification to control file backup operations according to an exemplary aspect. The method 600 is an exemplary implementation of components of the system 100 as executed by portions of the computer 20 shown in FIG. 4.

Initially, at step 605, the data storage management device 110 receives one or more data files or objects (e.g., data files 101) to be archived. As noted above, the files may be transmitted by a client device requesting archive or in response to a periodic archive procedure performed by the data storage management device 110 for each client device it is managing, for example. Next, at step 610, each file 101 is passed to file analysis module 222 where the file parameters and properties are identified and passed to classification engine 224 of data storage module 220 to classify each file according to the identified parameters and properties.

The classification of each file 101 is then passed to backup agent 226. According to an exemplary aspect, at step 615, the backup agent 226 determines whether the file has been classified by classification engine 224 as a "shared" file (shared between multiple users) as discussed above. Moreover, if the file is classified as "shared", there may be data backup rules in the data rules and policies 212 that indicate that "shared files do not need to be stored and only need to be archived in a local storage server 130A, for example. Thus, at step 620, the backup agent 226 applies the "shared" classification to the data rules and policies 212 and performs the defined archive procedure. For example, if the "shared" file is to be stored on a local storage server, the backup agent 226 may identify the appropriate storage server and transmit the file to this server for storage accordingly.

Alternatively, if the file is not deemed "shared", the process proceeds to step 625 and determines whether the file is classified as important, or, "critical" according to classification engine 224, as discussed above. If so, the method proceeds to step 630 where the backup agent 226 performs the secure storage procedure, such as transmitting this critical file to critical vault 120 according to an exemplary aspect.

Otherwise, the method proceeds to step 635 as shown in FIG. 6B. At this step, the backup agent 226 applies the identified parameters and properties to the data rules and policies 212 to determine whether the file requires any archiving. If not, the method proceeds to step 640 where no backup is performed and the method ends. In one example, the file can be deleted from the local memory of the data storage management device 110. Otherwise, if the file 101 requires regular archive/backup, the backup agent 226 causes the file 101 to be transmitted to the storage server 130, or cloud storage 140, for example. Again, these storage procedures are defined in the data rules and policies 212, and can be set in advance by a system administrator for example. In view of this method, an automatic storage algorithm is provided for classifying and storing files accordingly.

Figure 7:
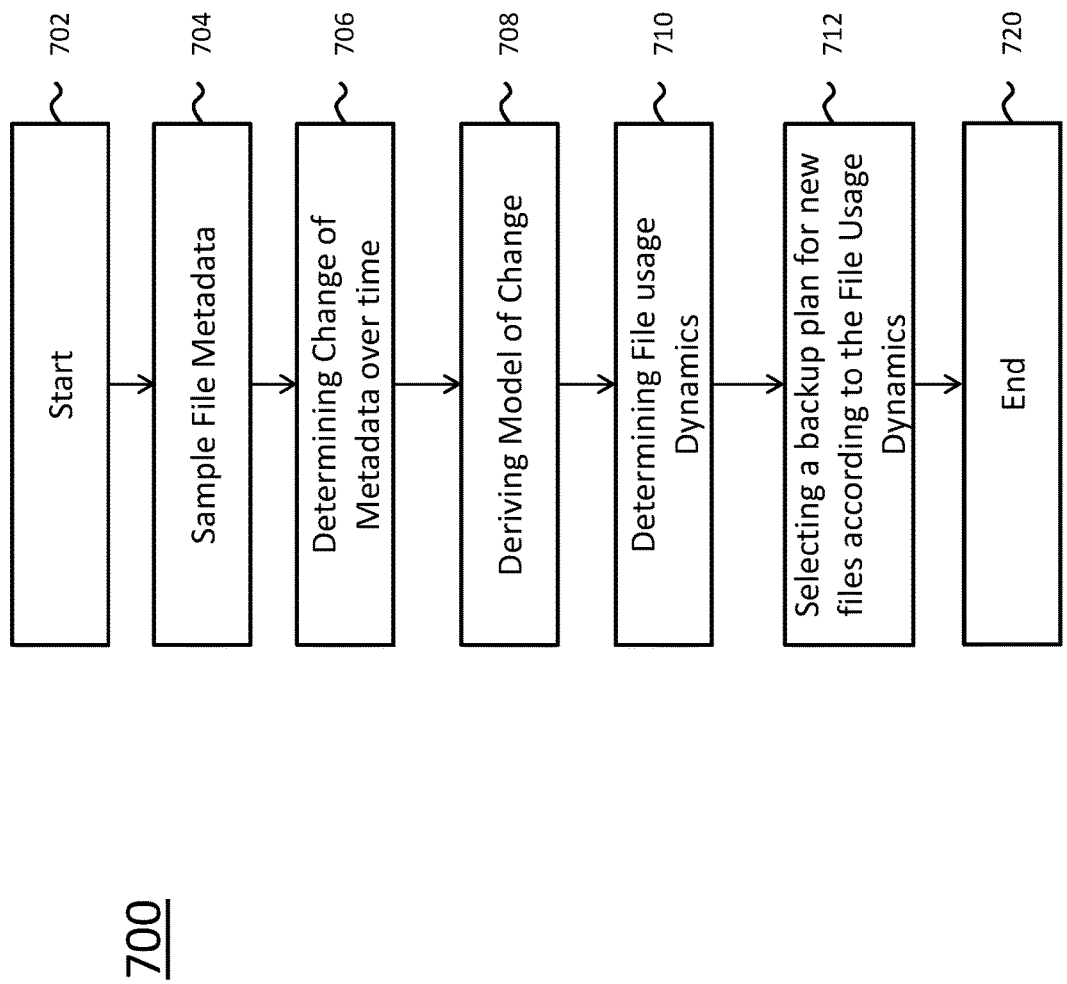
FIG. 7 illustrates a flowchart of a method for data classification to control file backup operations according to an exemplary aspect.

FIG. 7 illustrates a flowchart of a method 700 for data classification to control file backup operations according to an exemplary aspect. The method 600 is an exemplary implementation of components of the system 100 as executed by portions of the computer 20 shown in FIG. 4.

The method starts at 702 and proceeds to 704. At 704, the data storage server 130 may periodically collect (in other words, sample) or receive metadata from various client devices. The metadata may be part of a network packet also containing data for files being backed up. In another aspect, the metadata may be received or collected separately from the backup data. The metadata comprises attributes/features of the data on the client device, or the data to be backed up. Such features may include file size, file type, creation date, modification date, delete date, and the like. The attribute information stored in the metadata is not limited to the previous features, and may include any information that is stored on the client device relating to data files.

At 706, the data storage server determines whether the metadata has changed over time, after collecting the metadata for a predetermined period of time. In some aspects, change is measured according to a deviation of the average values greater than a threshold value in the metadata over a predetermined period of time. Significance of change is dependent on its impact on file usage dynamics. If the change in file usage dynamics trend remains unchanged within a predefined range (for example, 1% or 5%), the metadata change is considered insignificant. In general, for particular system implementations if the metadata change does not impact system policy, the metadata change can be considered insignificant. In one aspect, in 706 only the actual change in metadata over time is determined as opposed to a threshold comparison.

Based on the change information obtained at 706, a model of changing metadata is created at 708. The model of change indicates how particular metadata has changed over time on a particular client device, or a cluster of devices. At 710, the model of change can be used to determine file usage dynamics on the various client devices from which the metadata is collected. In one aspect, the file usage dynamics may comprise how often types of files were created, opened, modified, deleted, moved, the quantity of types of files, the periodicity of their creation. File usage dynamics may also be more aggregative in another aspect. For example, more aggressive file usage dynamics may comprise what the change in capacity growth is, how fast the size of a specific file type is growing or a change in spectrum (small-to-large file) of file sizes etc.

At 712, the file usage dynamics are used by the data storage server 102 to select a backup plan for the new files. For example, if certain files are received with a particular pattern of metadata, these files will be stored in proportionally critical data locations based on how files with similar metadata were stored. Over time, as more data is gathered, the backup plans suggested for particular file types will be more accurate and an accuracy score of predictions will improve over a larger span of time. The method ends at 720.

Figure 8:
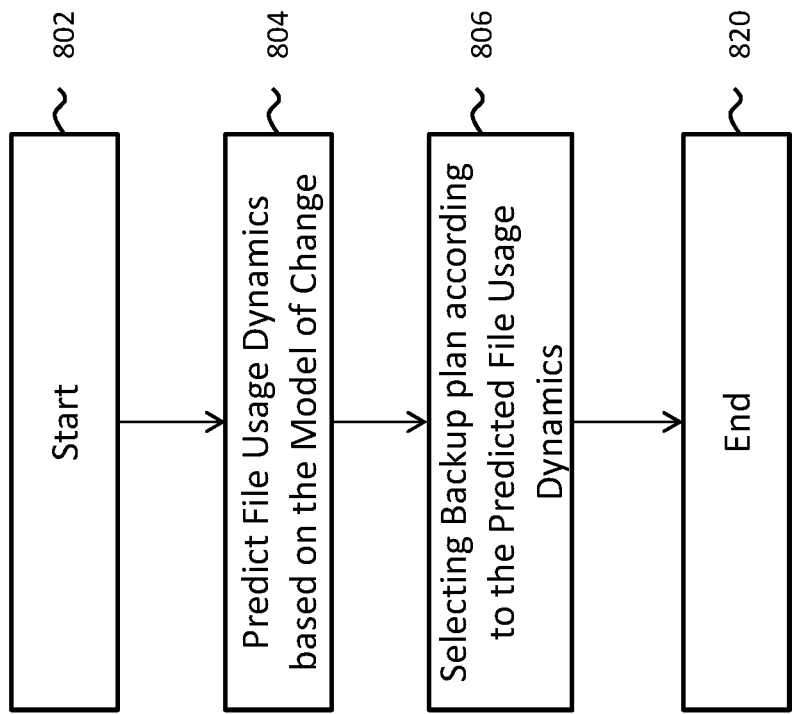
FIG. 8 illustrates a flowchart of a method for predicting data classification to control file backup operations according to an exemplary aspect.

FIG. 8 illustrates a flowchart of a method 800 for predicting data classification to control file backup operations according to an exemplary aspect. The method 800 is an exemplary implementation of components of the system 100 as executed by portions of the computer 20 shown in FIG. 4.

The method starts at 802 and proceeds to 804. At 804, the prediction module 500 predicts file usage dynamics based on previous file usage dynamics and the model of change of metadata over time using feature information in the metadata storage 400.

At 806, the prediction module 500 selects backup plan of files that are newly stored on the client device based on the predicted file usage dynamics. Additionally, the prediction module 500 may also determine what kind of files are most often created, opened, accessed, modified, removed and the like, what kind of files grow in a monotonic manner, what kind of files are periodically or a-periodically accessed, what kind of operations cause large changes in the system storage capacity or backup, and the like.

The prediction module 500 may also predict file urgency, file growth and file size growth for particular users on client devices. According to one aspect, file urgency is indicated by how recently a file was created. For example a file that a user created today is likely to be more important today than a file that was created one week ago, one month ago, or one year ago. So, if a user's machine fails today, he or she needs high priority access to the file that the user created today, in a simple time based scenario. According to one aspect, in a complex scenario urgency for a user may be dependent on what type of files, created, accessed, modified, frequency of accesses or modifications, size of files, filenames, duplicates, or the like.

Figure 9:
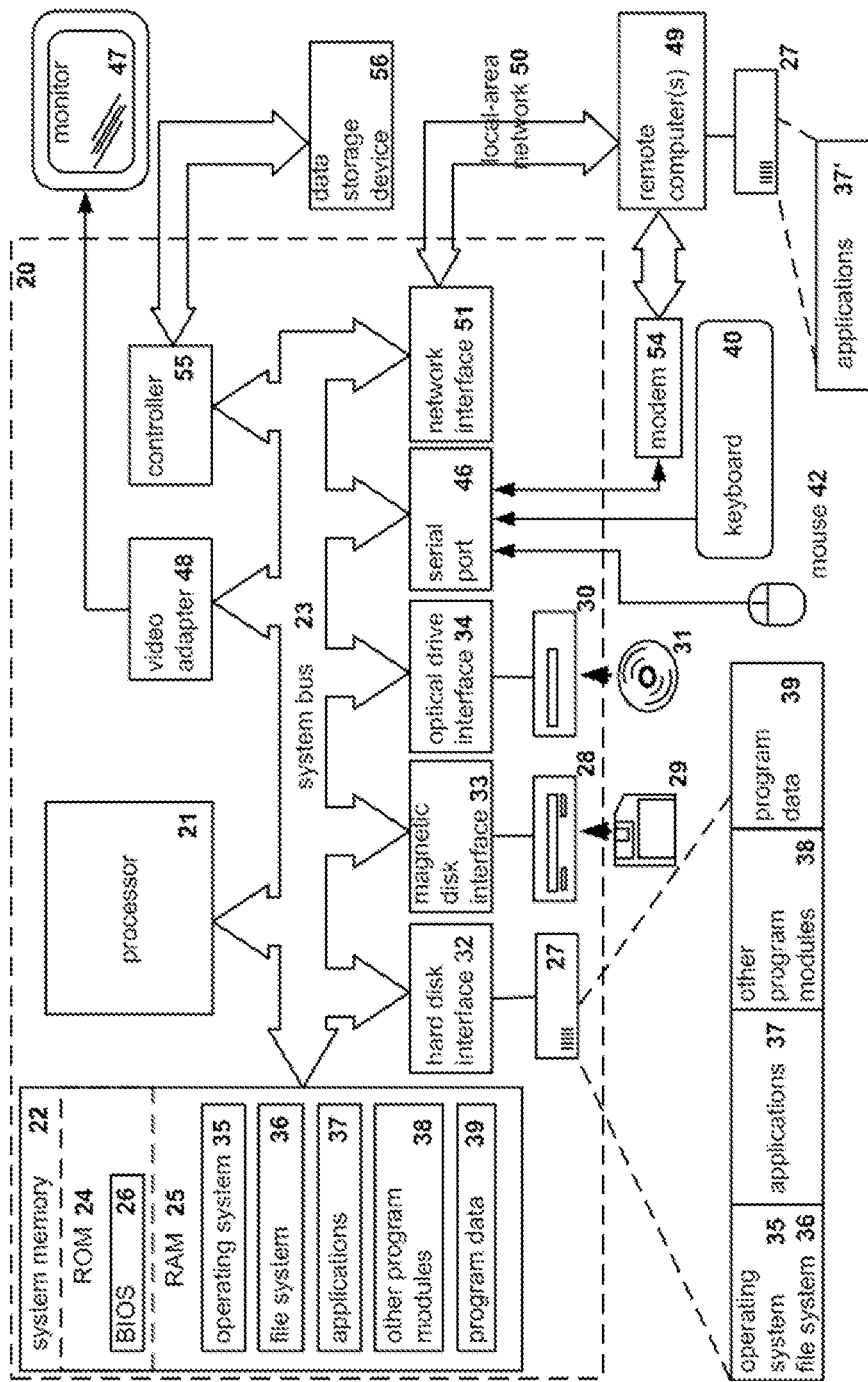
FIG. 9 illustrates a block diagram of an example of a general-purpose computer system on which the disclosed system and method can be implemented according to an example aspect.

FIG. 9 illustrates a block diagram of an example of a general-purpose computer system (which can be a server) on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to the data storage management device 110, processing unit 21 can correspond to CPU 210, and system memory 22 and/or file system 36 can correspond to memory configured to store the data rules and policies 212 and/or code for executing data storage module 220.

As further shown, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules and other data for the computer 20.

Although the exemplary environment described herein employs a hard disk, a removable magnetic disk 29 and a removable optical disk 31, it should be appreciated by those skilled in the art that other types of computer-readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules (e.g., data storage module 220) may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20. The logical connections include a network interface 51 and connected to a local area network (i.e., LAN) 51, for example, and/or a wide area network (not shown). Such networking environments are commonplace in offices, enterprise-wide computer networks, Intranets and the Internet. It should be appreciated that remote computers 49 can correspond to the different storage systems described above and/or client computers having the files 101 to be archived.

When used in a LAN networking environment, the computer 20 is connected to the local network 51 through a network interface or adapter 53. When used in a WAN networking environment, the computer 20 typically includes a modem 54 or other means for establishing communications over the wide area network, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for performing backup of electronic data, the method comprising:
   sampling metadata of files on a computer during a predetermined time interval, wherein the files are backed up to a storage server in accordance with a first backup plan;
   extracting derivative features from attributes of the metadata by:
   analyzing values in the attributes of the metadata; and
   encoding the values analyzed into encoded values in a particular format for the derivative features, wherein the derivative features are created based on different types of values in the metadata;
   predicting file usage dynamics for a time interval subsequent to the predetermined time interval, based on a combination of the derivative features and the attributes of the metadata, wherein the predicted file usage dynamics indicate, for the time interval, how the files are utilized on the computer, and one or more of: which of the files are subjected to particular file operations more often than other files, which of the files grow in a monotonic manner, which of the files are periodically accessed, and which of the files are un-periodically accessed;
   comparing the predicted file usage dynamics for the time interval with file usage dynamics of the predetermined time interval; and
   in response to determining, based on the comparison, that a difference between the predicted file usage dynamics and the file usage dynamics of the predetermined time interval exceeds a threshold difference:
   selecting a second backup plan for the files; and
   backing up the files to the storage server in accordance with the second backup plan.

2. The method of claim 1, further comprising:
   bounding the encoded values according to the particular format; and
   extracting the derivative features from the attributes in the metadata according to the encoded values.

3. The method of claim 1, further comprising:
   in response to determining, based on the comparison, that the difference between the predicted file usage dynamics and the file usage dynamics of the predetermined time interval does not exceed the threshold difference, not selecting a new backup plan for the files.

4. The method of claim 1, further comprising:
   in response to determining, based on the comparison, that the difference between the predicted file usage dynamics and the file usage dynamics of the predetermined time interval exceeds the threshold difference:
  deriving a model of change of the metadata over time, wherein the model of change is a snapshot of dynamically sampled attributes of the files and reflects a state of the computer over the predetermined time interval.

5. The method of claim 4, further comprising:
  predicting, based on the model of change, a speed of change in size of files of a particular file type and a change in capacity of the computer subsequent to the predetermined time interval;
  generating an urgency model based on the metadata further indicating (1) how soon a file must be retrieved from backup and (2) conditions on whether to back up the file in low latency storage or high latency storage;
  identifying on the computer at least one newly stored file of a first file type;
  selecting a third backup plan for the at least one newly stored file, the third backup plan indicating when and where to perform a backup according to a determined urgency of the at least one newly stored file, a predicted speed of change in size of files of the first file type, and the predicted change in capacity of the computer.

6. The method of claim 5, further comprising one or more of:
  predicting urgency of the at least one newly stored file on the computer based on the urgency model; and
  predicting attributes of the at least one newly stored file on the computer based on the urgency model.

7. The method of claim 6, wherein the predicted attributes comprise one or more of file type and file size.

8. A system for performing backup of electronic data, the system comprising:
  a hardware processor configured to:
  sample metadata of files on a computer during a predetermined time interval, wherein the files are backed up to a storage server in accordance with a first backup plan;
  extract derivative features from attributes of the metadata by:
  analyzing values in the attributes of the metadata; and
  encoding the values analyzed into encoded values in a particular format for the derivative features, wherein the derivative features are created based on different types of values in the metadata;
  predict file usage dynamics for a time interval subsequent to the predetermined time interval, based on a combination of the derivative features and the attributes of the metadata, wherein the predicted file usage dynamics indicate, for the time interval, how the files are utilized on the computer, and one or more of: which of the files are subjected to particular file operations more often than other files, which of the files grow in a monotonic manner, which of the files are periodically accessed, and which of the files are un-periodically accessed;
  compare the predicted file usage dynamics for the time interval with file usage dynamics of the predetermined time interval; and
  in response to determining, based on the comparison, that a difference between the predicted file usage dynamics and the file usage dynamics of the predetermined time interval exceeds a threshold difference:
  select a second backup plan for the files; and
  back up the files to the storage server in accordance with the second backup plan.

9. The system of claim 8, wherein the hardware processor is further configured to:
  bound the encoded values according to the particular format; and
  extract the derivative features from the attributes in the metadata according to the encoded values.

10. The system of claim 8, wherein the hardware processor is further configured to:
  in response to determining, based on the comparison, that the difference between the predicted file usage dynamics and the file usage dynamics of the predetermined time interval does not exceed the threshold difference, not select a new backup plan for the files.

11. The system of claim 8, wherein the hardware processor is further configured to:
  in response to determining, based on the comparison, that the difference between the predicted file usage dynamics and the file usage dynamics of the predetermined time interval exceeds the threshold difference:
  derive a model of change of the metadata over time, wherein the model of change is a snapshot of dynamically sampled attributes of the files and reflects a state of the computer over the predetermined time interval.

12. The system of claim 11, wherein the hardware processor is further configured to:
  predict, based on the model of change, a speed of change in size of files of a particular file type and a change in capacity of the computer subsequent to the predetermined time interval;
  generate an urgency model based on the metadata further indicating (1) how soon a file must be retrieved from backup and (2) conditions on whether to back up the file in low latency storage or high latency storage;
  identify on the computer at least one newly stored file of a first file type;
  select a third backup plan for the at least one newly stored file, the third backup plan indicating when and where to perform a backup according to a determined urgency of the at least one newly stored file, a predicted speed of change in size of files of the first file type, and the predicted change in capacity of the computer.

13. The system of claim 12, wherein the hardware processor is further configured to perform one or more of:
  predicting urgency of the at least one newly stored file on the computer based on the urgency model; and
  predicting attributes of the at least one newly stored file on the computer based on the urgency model.

14. The system of claim 13, wherein the predicted attributes comprise one or more of file type and file size.

15. A non-transitory computer-readable medium storing thereon instructions that when executed perform a method for backup of electronic data, the instructions comprising:
  sampling metadata of files on a computer during a predetermined time interval, wherein the files are backed up to a storage server in accordance with a first backup plan;
  extracting derivative features from attributes of the metadata by:
  analyzing values in the attributes of the metadata; and
  encoding the values analyzed into encoded values in a particular format for the derivative features, wherein the derivative features are created based on different types of values in the metadata;
  predicting file usage dynamics for a time interval subsequent to the predetermined time interval, based on a combination of the derivative features and the attributes of the metadata, wherein the predicted file usage dynamics indicate, for the time interval, how the files are utilized on the computer, and one or more of:

which of the files are subjected to particular file operations more often than other files, which of the files grow in a monotonic manner, which of the files are periodically accessed, and which of the files are un-periodically accessed;

comparing the predicted file usage dynamics for the time interval with file usage dynamics of the predetermined time interval; and in response to determining, based on the comparison, that a difference between the predicted file usage dynamics and the file usage dynamics of the predetermined time interval exceeds a threshold difference:

selecting a second backup plan for the files; and backing up the files to the storage server in accordance with the second backup plan.

* * * * *